United States Patent
Ouyang

(10) Patent No.: US 9,351,199 B2
(45) Date of Patent: May 24, 2016

(54) COMMUNICATION METHOD OF WIRELESS TERMINAL AND HOST DEVICE ACCORDING TO A NETWORK LAYER DATA TRANSFER PROTOCOL, WIRELESS TERMINAL, AND HOST DEVICE

(71) Applicant: Huawei Device Co., LTD., Shenzhen (CN)

(72) Inventor: Xun Ouyang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 207 days.

(21) Appl. No.: 14/020,952

(22) Filed: Sep. 9, 2013

(65) Prior Publication Data

US 2014/0010165 A1     Jan. 9, 2014

Related U.S. Application Data

(63) Continuation of application No. PCT/CN2012/071986, filed on Mar. 6, 2012.

(30) Foreign Application Priority Data

Mar. 9, 2011 (CN) .......................... 2011 1 0056626

(51) Int. Cl.
*G01R 31/08* (2006.01)
*G06F 11/00* (2006.01)
(Continued)

(52) U.S. Cl.
CPC ............... *H04W 28/18* (2013.01); *H04L 67/06* (2013.01); *H04L 69/325* (2013.01); *H04W 4/00* (2013.01)

(58) Field of Classification Search
CPC ..... H04W 88/023; H04W 28/18; H04W 4/00; H04L 67/06; H04L 69/325
See application file for complete search history.

(56) References Cited

U.S. PATENT DOCUMENTS 6,950,859 B1 * 9/2005 Bartek et al. ................. 709/217
7,185,136 B2 * 2/2007 Zarns ............................ 710/315
(Continued)

FOREIGN PATENT DOCUMENTS

| CN | 1941738 A | 4/2007 |
|---|---|---|
| CN | 101764695 A | 6/2010 |

(Continued)

OTHER PUBLICATIONS

Extended and Supplementary European Search Report issued on Dec. 22, 2014 in corresponding European Patent Application No. 12754480.7.
(Continued)

*Primary Examiner* — Abdelnabi Musa
(74) *Attorney, Agent, or Firm* — Staas & Halsey LLP

(57) ABSTRACT

The present invention provides a communication method for a wireless terminal and a host device, a wireless terminal, and a host device. The method includes: reporting, by a wireless terminal, a port type of a port corresponding to the wireless terminal to a host device, where the port type is based on a network layer data transfer protocol, so that the host device drives the port by using a port driver corresponding to the port type; establishing, by the wireless terminal, a communication link that is based on the network layer data transfer protocol between the wireless terminal and the host device through interaction with the host device via the port; and transmitting, by the wireless terminal, a service packet and a type of the service packet via the communication link that is based on the network layer data transfer protocol.

12 Claims, 3 Drawing Sheets

(51) Int. Cl.
  *G08C 15/00* (2006.01)
  *H04L 1/00* (2006.01)
  *H04W 28/18* (2009.01)
  *H04L 29/08* (2006.01)
  *H04W 4/00* (2009.01)

(56) References Cited

U.S. PATENT DOCUMENTS

| | | | |
|---|---|---|---|
| 7,213,044 B2 * | 5/2007 | Tjong et al. | 709/200 |
| 7,346,026 B2 * | 3/2008 | Sherman et al. | 370/328 |
| 7,509,487 B2 * | 3/2009 | Lu et al. | 713/151 |
| 2009/0307679 A1 * | 12/2009 | Lee et al. | 717/168 |
| 2012/0069855 A1 | 3/2012 | Zhang et al. | |
| 2013/0061286 A1 | 3/2013 | Fang et al. | |

FOREIGN PATENT DOCUMENTS

| | | |
|---|---|---|
| CN | 101938848 A | 1/2011 |
| CN | 101977244 A | 2/2011 |
| CN | 102186257 A | 9/2011 |
| EP | 2 432 192 A1 | 3/2012 |
| EP | 2563091 A1 | 2/2013 |
| JP | 2004-159008 | 6/2004 |
| JP | 2008-72533 | 3/2008 |
| JP | 2009-88874 | 4/2009 |
| JP | 2011-10060 | 1/2011 |
| WO | WO 2005/033847 A2 | 4/2005 |

OTHER PUBLICATIONS

PCT International Search Report and Written Opinion of the International Searching Authority mailed Jun. 14, 2012 in corresponding International Application No. PCT/CN2012/071986 (12 pp.).
Chinese Office Action mailed Jan. 31, 2013 in corresponding Chinese Application No. 201110056626.0.
Japanese Office Action dated Mar. 10, 2015 in corresponding Japanese Patent Application No. 2013-556955.
Japanese Office Action issued on Sep. 30, 2014 in corresponding Japanese Patent Application No. 2013-556955.
International Search Report mailed Jun. 14, 2012 in corresponding International Application No. PCT/CN2012/071986.
Japanese Decision of Rejection dated Jul. 7, 2015 in corresponding Japanese Patent Application No. 2013-556955.
Japanese Decision to Reject the Amendments dated Jul. 7, 2015 in corresponding Japanese Patent Application No. 2013-556955.

* cited by examiner

COMMUNICATION METHOD OF WIRELESS TERMINAL AND HOST DEVICE ACCORDING TO A NETWORK LAYER DATA TRANSFER PROTOCOL, WIRELESS TERMINAL, AND HOST DEVICE

CROSS-REFERENCE TO RELATED APPLICATIONS

This application is a continuation of International Application No. PCT/CN2012/071986, filed on Mar. 6, 2012, which claims priority to Chinese Patent Application No. 201110056626.0, filed on Mar. 9, 2011, both of which are hereby incorporated by reference in their entireties.

TECHNICAL FIELD

The present invention relates to communications technologies, and in particular, to a communication method for a wireless terminal and a host device, a wireless terminal, and a host device.

BACKGROUND

With the development of wireless terminals (such as data cards and M2M wireless modules), in an environment where a service is performed on a computer by using a wireless terminal, besides data services, a wireless terminal may be used to implement many other services, such as TF card reading and writing, CDROM reading and writing, short message sending, call making, and phone book service. When performing information exchange with a host device (such as a computer and a household appliance), a wireless terminal may map a plurality of ports corresponding to a plurality of services on the host device and transmit packets of each service by using a protocol supported by the service via the port corresponding to each service.

However, before the wireless terminal transmits packets of each service by using the protocol supported by each service via the port corresponding to each service, the host device needs to upload a driver corresponding to the port corresponding to each service (that is, drive the port corresponding to each service by using the driver corresponding to the port corresponding to each service), thereby increasing driver development cost; in addition, compatibility of drivers of different manufacturers on different host devices cannot be guaranteed, thereby affecting normal operation of wireless terminal services.

SUMMARY

Embodiments of the present invention provide a communication method for a wireless terminal and a host device, a wireless terminal, and a host device, which are used to reduce driver development cost, and ensure normal operation of wireless terminal services.

An embodiment of the present invention provides a communication method for a wireless terminal, including:

reporting, by a wireless terminal, a port type of a port corresponding to the wireless terminal to a host device, where the port type is based on a network layer data transfer protocol, so that the host device drives the port by using a port driver corresponding to the port type;

establishing, by the wireless terminal, a communication link that is based on the network layer data transfer protocol between the wireless terminal and the host device through interaction with the host device via the port; and transmitting, by the wireless terminal, a service packet and a type of the service packet via the communication link that is based on the network layer data transfer protocol.

An embodiment of the present invention provides a communication method for a host device, including:

obtaining, by a host device, a port type of a port corresponding to a wireless terminal reported by the wireless terminal, where the port type is based on a network layer data transfer protocol;

driving, by the host device, the port by using a port driver corresponding to the port type;

establishing, by the host device, a communication link that is based on the network layer data transfer protocol between the host device and the wireless terminal through interaction with the wireless terminal via the port; and transmitting, by the host device, a service packet and a type of the service packet via the communication link that is based on the network layer data transfer protocol.

An embodiment of the present invention further provides a wireless terminal, including:

a reporting module, configured to report a port type of a port corresponding to the wireless terminal to a host device, where the port type is based on a network layer data transfer protocol, so that the host device drives the port by using a port driver corresponding to the port type;

an establishing module, configured to establish a communication link that is based on the network layer data transfer protocol between the wireless terminal and the host device through interaction with the host device via the port; and a transmitting module, configured to transmit a service packet and a type of the service packet via the communication link that is based on the network layer data transfer protocol.

An embodiment of the present invention further provides a host device, including:

an obtaining module, configured to obtain a port type of a port corresponding to a wireless terminal reported by the wireless terminal, where the port type is based on a network layer data transfer protocol;

a driving module, configured to drive the port by using a port driver corresponding to the port type;

an establishing module, configured to establish a communication link that is based on the network layer data transfer protocol between the host device and the wireless terminal through interaction with the wireless terminal via the port; and a transmitting module, configured to transmit a service packet and a type of the service packet via the communication link that is based on the network layer data transfer protocol.

According to the foregoing technical solutions, in the embodiments of the present invention, a wireless terminal reports a port type of a port corresponding to the wireless terminal to a host device, where the port type is based on a network layer data transfer protocol, so that the host device drives the port by using a port driver corresponding to the port type; the wireless terminal establishes a communication link that is based on the network layer data transfer protocol between the wireless terminal and the host device through interaction with the host device via the port, so that the wireless terminal is capable of transmitting a service packet and a type of the service packet via the communication link that is based on the network layer data transfer protocol; the host device and the wireless terminal are capable of parsing the service packet according to the type of the service packet. In this way, the host device does not need to upload a driver corresponding to a port corresponding to each service. Because each service corresponds to the same port that is based on the network layer data transfer protocol, the host device only needs to drive the port by using the port driver corresponding to the port, thereby reducing the driver development cost and ensuring the normal operation of wireless terminal services.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To illustrate the objectives, technical solutions, and advantages of the embodiments of the present invention more clearly, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The wireless terminal in the embodiments of the present invention may include but be not limited to a data card or a machine to machine (Machine to Machine, M2M for short) wireless module; the host device (host device) may include but be not limited to a computer or household appliance (such as a refrigerator, a water meter, and a watt-hour meter). The wireless terminal may connect to the host device by using a physical port of the host device, for example, a USB port of a data card is inserted into a USB slot of a computer.

Figure 1:
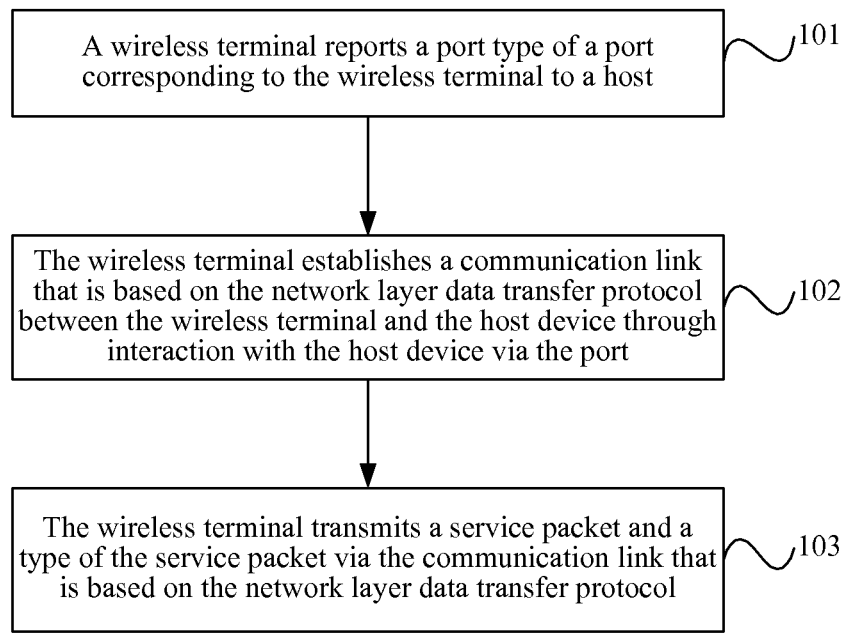
FIG. 1 is a schematic flowchart of a communication method for a wireless terminal according to Embodiment 1 of the present invention.

FIG. 1 is a schematic flowchart of a communication method for a wireless terminal according to Embodiment 1 of the present invention. As shown in FIG. 1, the communication method for a wireless terminal in the embodiment may include the following steps:

Step 101: A wireless terminal reports a port type of a port corresponding to the wireless terminal to a host device, where the port type is based on a network layer data transfer protocol, so that the host device drives the port by using a port driver corresponding to the port type.

The network layer data transfer protocol may include but be not limited to an IP protocol, a sequenced packet exchange (Sequenced Packet Exchange, SPX for short) protocol/internetwork packet exchange (Internetwork Packet Exchange, IPX for short) protocol, or a NetBios enhanced user interface (NetBIOS Enhanced User Interface, NetBEUI for short) protocol.

Step 102: The wireless terminal establishes a communication link that is based on the network layer data transfer protocol between the wireless terminal and the host device through interaction with the host device via the port.

Specifically, the wireless terminal may specifically work as a dynamic host configuration protocol (Dynamic Host Configuration Protocol, DHCP for short) server to perform a DHCP process with the host device, so as to assign IP addresses for the wireless terminal and the host device by using the DHCP, and establish the communication link that is based on the network layer data transfer protocol between the wireless terminal and the host device, such as an Ethernet link. Specifically, a DHCP function may be preconfigured on the wireless terminal and the host device, and after the host device drives the port by using a port driver corresponding to the port type, the host can be triggered to apply to the wireless terminal for IP addresses. The wireless terminal may specifically use the DHCP to select two IP addresses (private network addresses) in a preconfigured address pool and assign the IP addresses to the wireless terminal and the host device. In this way, the communication link that is based on the network layer data transfer protocol between the wireless terminal and the host device is established.

Step 103: The wireless terminal transmits a service packet and a type of the service packet via the communication link that is based on the network layer data transfer protocol.

The wireless terminal transmits a service packet and a type of the service packet to the host device on the communication link that is based on the network layer data transfer protocol so that the host device can parse the service packet according to the type of the service packet; correspondingly, the host device transmits a service packet and a type of the service packet to the wireless terminal on the communication link that is based on the network layer data transfer protocol so that the wireless terminal can parse the service packet according to the type of the service packet.

Specifically, the type of the service packet may include but be not limited to small computer standard interface (Small Computer Standard Interface, SCSI for short) data, an AT command, IP data, or diagnostic (Diagnostic, DIAG for short) data.

In the embodiment of the present invention, a wireless terminal reports a port type of a port corresponding to the wireless terminal to a host device, where the port type is based on a network layer data transfer protocol, so that the host device drives the port by using a port driver corresponding to the port type; the wireless terminal establishes a communication link that is based on the network layer data transfer protocol between the wireless terminal and the host device through interaction with the host device via the port, so that the wireless terminal is capable of transmitting a service packet and a type of the service packet via the communication link that is based on the network layer data transfer protocol; the host device is capable of parsing the service packet according to the type of the service packet. In this way, the host device does not need to upload a driver corresponding to a port corresponding to each service. Because each service corresponds to the same port that is based on the network layer data transfer protocol, the host device only needs to drive the port by using the port driver corresponding to the port, thereby reducing the driver development cost and ensuring the normal operation of wireless terminal services. In addition, the embodiment of the present invention does not need to rely on a wireless network and has high flexibility.

Figure 2:
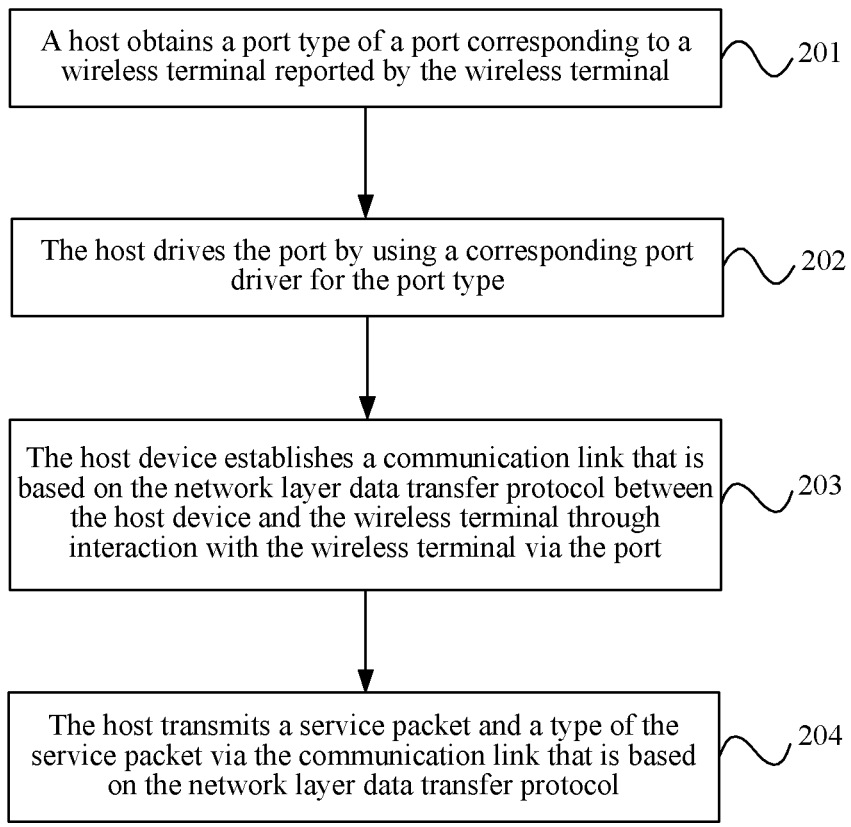
FIG. 2 is a schematic flowchart of a communication method for a host device according to Embodiment 2 of the present invention.

FIG. 2 is a schematic flowchart of a communication method for a host device according to Embodiment 2 of the present invention. As shown in FIG. 2, the communication method for a host device in the embodiment may include the following steps:

Step 201: A host device obtains a port type of a port corresponding to a wireless terminal reported by the wireless terminal, where the port type is based on a network layer data transfer protocol.

The network layer data transfer protocol may include but be not limited to an IP protocol, a sequenced packet exchange (Sequenced Packet Exchange, SPX for short) protocol/internetwork packet exchange (Internetwork Packet Exchange, IPX for short) protocol, or a NetBios enhanced user interface (NetBIOS Enhanced User Interface, NetBEUI for short) protocol.

Step 202: The host device drives the port by using a port driver corresponding to the port type.

In this step, the host device may upload a port driver corresponding to the port type to drive the port.

Step 203: The host device establishes a communication link that is based on the network layer data transfer protocol between the host device and the wireless terminal through interaction with the wireless terminal via the port.

Specifically, the wireless terminal may specifically work as a dynamic host configuration protocol (Dynamic Host Configuration Protocol, DHCP for short) server to perform a DHCP process with the host device so as to assign IP addresses for the wireless terminal and the host device by using the DHCP. After the host device obtains the IP address that the wireless terminal assigns to the host device, the host device establishes the communication link that is based on the network layer data transfer protocol between the host device and the wireless terminal, such as an Ethernet link. Specifically, a DHCP function may be preconfigured on the wireless terminal and the host device, and after the host device drives the port by using a port driver corresponding to the port type, the host can be triggered to apply to the wireless terminal for IP addresses. The wireless terminal may specifically use the DHCP to select two IP addresses (private network addresses) in a preconfigured address pool and assign the IP addresses to the wireless terminal and the host device. In this way, the communication link that is based on the network layer data transfer protocol between the wireless terminal and the host device is established.

Step 204: The host device transmits a service packet and a type of the service packet via the communication link that is based on the network layer data transfer protocol so that the wireless terminal parses the service packet according to the type of the service packet.

Specifically, the type of the service packet may include but be not limited to small computer standard interface (Small Computer Standard Interface, SCSI for short) data, an AT command, IP data, or diagnostic (Diagnostic, DIAG for short) data.

In the embodiment of the present invention, a host device obtains a port type of a port corresponding to a wireless terminal reported by the wireless terminal, where the port type is based on a network layer data transfer protocol, so that the host device is capable of driving the port by using a port driver corresponding to the port type; the host device establishes a communication link that is based on the network layer data transfer protocol between the wireless terminal and the host device through interaction with the host device via the port, so that the host device is capable of transmitting a service packet and a type of the service packet via the communication link that is based on the network layer data transfer protocol; the host device and the wireless terminal are capable of parsing the service packet according to the type of the service packet. In this way, the host device does not need to upload a driver corresponding to a port corresponding to each service. Because each service corresponds to the same port that is based on the network layer data transfer protocol, the host device only needs to drive the port by using the port driver corresponding to the port, thereby reducing the driver development cost and ensuring the normal operation of wireless terminal services. In addition, the embodiment of the present invention does not need to rely on a wireless network and has high flexibility.

Figure 3:
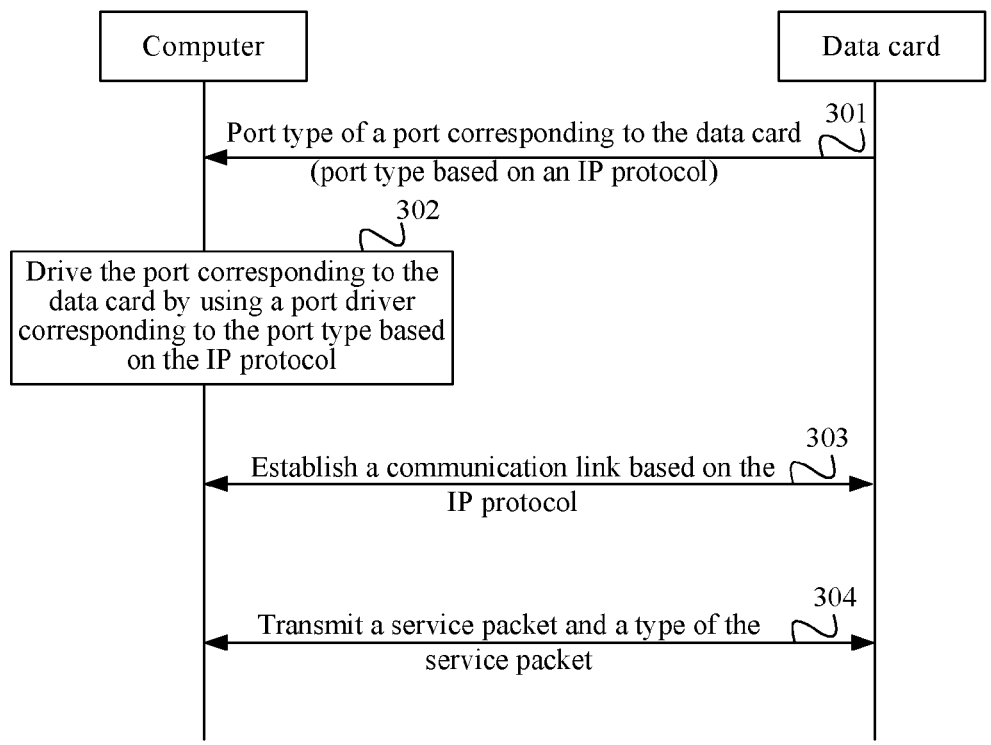
FIG. 3 is a schematic flowchart of a communication processing method for a host device according to Embodiment 3 of the present invention.

To illustrate the method provided by the embodiment of the present invention more clearly, the following provides an example with an IP protocol used as the network layer data transfer protocol. FIG. 3 is a schematic flowchart of a communication processing method for a host device according to Embodiment 3 of the present invention. As shown in FIG. 3, the communication processing method for a wireless terminal in the embodiment may include the following steps:

Step 301: After being inserted into a computer, a data card reports a port type of a port corresponding to the data card to the computer, where the port type is based on an IP protocol.

Step 302: The computer drives the port corresponding to the data card by using a port driver corresponding to the port type based on the IP protocol.

Step 303: The data card works as a DHCP server to perform a DHCP process with the computer, uses the DHCP to assign IP addresses for the data card and the computer, and establishes a communication link based on the IP protocol between the data card and the computer.

Specifically, a DHCP function may be preconfigured on the data card and the computer, and after step 302 is implemented, the computer can be triggered to apply to the data card for IP addresses. The data card may use the DHCP to select two IP addresses (private network addresses) in a preconfigured address pool and assign the IP addresses to the data card and the computer. In this way, the communication link based on the IP protocol between the data card and the computer is established.

The communication link based on the IP protocol established in this step is only a link between a data card and a computer and is not limited by networks. The link is established right after the data card is powered on (where steps 301 and 302 are implemented right after the data card is powered on).

Step 304: The data card and the computer transmit a service packet and a type of the service packet via the communication link based on the IP protocol.

Figure 4:
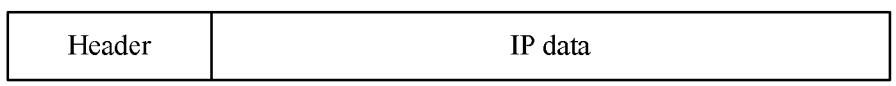
FIG. 4 is a schematic diagram of a format of an existing IP packet.
Figure 5:
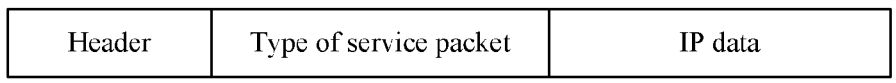
FIG. 5 is a schematic diagram of a format of an extended IP packet in the communication processing method for a host device according to Embodiment 3 of the present invention.

Specifically, a format of an existing IP packet (as shown in FIG. 4) may be extended to transmit the service packet and type of the service packet. As shown in FIG. 5, the IP packet header keeps unchanged, and it is only needed that 8-byte (bytes) space in the data portion (IP data) of the IP packet is reserved for the type of service packets transmitted between the data card and the computer. Specifically, the type of the packet may be listed in the following table.

| Type of Service Packet | Representation Method in IP Packet |
|---|---|
| SCSI data | 0x01 |
| AT command | 0x02 |
| IP data | 0x03 |
| DIAG data | 0x04 |
| ... | ... |

According to the type of the service packet, the peer device is capable of parsing the service packet so as to obtain the corresponding information.

In this embodiment, if the computer needs to establish a wireless communication connection with a wireless communication network through the data card, the established communication link based on the IP protocol may be used to establish the connection. That is, the computer uses the established communication link based on the IP protocol to perform two-stage dialing so as to establish the wireless communication connection with the wireless communication network. Specifically, the computer may send an IP packet to the data card on the established communication link based on the IP protocol. The IP packet includes an IP packet for establishing the wireless communication connection and the corresponding type identifier of the IP packet. The data card parses the IP packet for the second time and interacts with the wireless communication network so as to establish the wireless communication connection with the wireless communication network.

In this embodiment, a data card reports a port type of a port corresponding to the data card to a computer, where the port type is an IP based port type, so that the computer drives the port by using a port driver corresponding to the port type; the computer establishes a communication link based on the IP protocol between the data card and the computer through interaction with the computer via the port, so that the data card is capable of transmitting a service packet and a type of the service packet via the communication link based on the IP protocol; the data card and the computer are capable of parsing the service packet according to the type of the service packet. In this way, the computer does not need to upload a driver corresponding to a port corresponding to each service. Because each service corresponds to the same port that is based on the IP protocol, the computer only needs to drive the port by using the port driver corresponding to the port, thereby reducing the driver development cost and ensuring the normal operation of services on the data card, the wireless communication system. In addition, the embodiment of the present invention does not need to rely on a wireless network and has high flexibility.

It should be noted that, for brevity of description, all the foregoing method embodiments are described as combinations of a series of actions. However, persons skilled in the art should understand that the present invention is not limited by the described sequence of the actions because certain steps may be implemented in another sequence or implemented simultaneously based on the present invention. It should be further understood by persons skilled in the art that all the described embodiments in the specification are exemplary embodiments, and the involved actions and modules are not necessarily required by the present invention.

In the foregoing embodiments, the description of each embodiment has respective focuses. For a part that is not described in detail in a certain embodiment, reference may be made to related descriptions in other embodiments.

Figure 6:
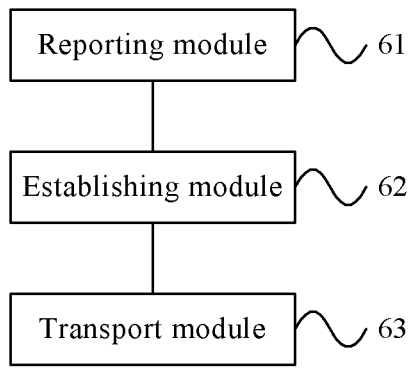
FIG. 6 is a schematic structural diagram of a wireless terminal according to Embodiment 4 of the present invention.

FIG. 6 is a schematic structural diagram of a wireless terminal according to Embodiment 4 of the present invention.

As shown in FIG. 6, the wireless terminal of the embodiment may include a reporting module 61, an establishing module 62, and a transmitting module 63. The reporting module 61 is configured to report a port type of a port corresponding to the wireless terminal to a host device, where the port type is based on a network layer data transfer protocol, so that the host device drives the port by using a port driver corresponding to the port type; the establishing module 62 is configured to establish a communication link that is based on the network layer data transfer protocol between the wireless terminal and the host device through interaction with the host device via the port; the transmitting module 63 is configured to transmit a service packet and a type of the service packet via the communication link that is based on the network layer data transfer protocol and established by the establishing module 62, so that the host device parses the service packet according to the type of the service packet.

Functions of both the wireless terminal in Embodiment 1 and the data card in Embodiment 3 may be implemented by the wireless terminal in this embodiment.

The network layer data transfer protocol may include but be not limited to an IP protocol, a sequenced packet exchange (Sequenced Packet Exchange, SPX for short) protocol/internetwork packet exchange (Internetwork Packet Exchange, IPX for short) protocol, or a NetBios enhanced user interface (NetBIOS Enhanced User Interface, NetBEUI for short) protocol; correspondingly, the establishing module 62 may use the DHCP to assign IP addresses for the wireless terminal and the host device and establish a communication link that is based on the network layer data transfer protocol between the wireless terminal and the host device.

In this embodiment, a reporting module reports a port type of a port corresponding to the wireless terminal to a host device, where the port type is based on a network layer data transfer protocol, so that the host device drives the port by using a port driver corresponding to the port type; an establishing module establishes a communication link that is based on the network layer data transfer protocol between the wireless terminal and the host device through interaction with the host device via the port, so that a transmitting module is capable of transmitting a service packet and a type of the service packet via the communication link that is based on the network layer data transfer protocol; the host device and the wireless terminal are capable of parsing the service packet according to the type of the service packet. In this way, the host device does not need to upload a driver corresponding to a port corresponding to each service. Because each service corresponds to the same port that is based on the network layer data transfer protocol, the host device only needs to drive the port by using the port driver corresponding to the port, thereby reducing the driver development cost and ensuring the normal operation of wireless terminal services. In addition, the embodiment of the present invention does not need to rely on a wireless network and has high flexibility.

Figure 7:
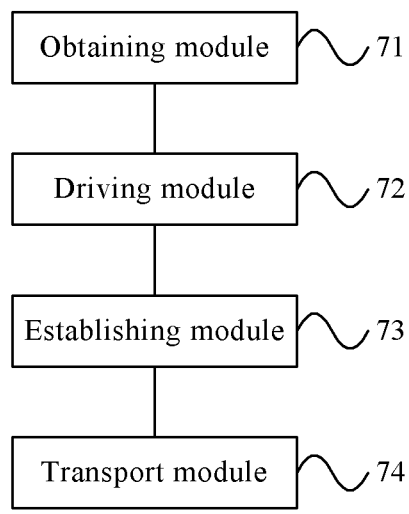
FIG. 7 is a schematic structural diagram of a host device according to Embodiment 5 of the present invention.

FIG. 7 is a schematic structural diagram of a host device according to Embodiment 5 of the present invention. As shown in FIG. 7, the host device of the embodiment may include an obtaining module 71, a driving module 72, an establishing module 73, and a transmitting module 74. The obtaining module 71 is configured to obtain a port type of a port corresponding to a wireless terminal reported by the wireless terminal, where the port type is based on a network layer data transfer protocol; the driving module 72 is configured to drive the port by using a port driver corresponding to the port type; the establishing module 73 is configured to establish a communication link that is based on the network layer data transfer protocol between the host device and the wireless terminal through interaction with the host device via the port; the transmitting module 74 is configured to transmit a service packet and a type of the service packet via the communication link that is based on the network layer data transfer protocol and established by the establishing module 73, so that the wireless terminal parses the service packet according to the type of the service packet.

Functions of both the host device in Embodiment 2 and the computer in Embodiment 3 may be implemented by the host device in this embodiment.

The network layer data transfer protocol may include but be not limited to an IP protocol, a sequenced packet exchange (Sequenced Packet Exchange, SPX for short) protocol/internetwork packet exchange (Internetwork Packet Exchange, IPX for short) protocol, or a NetBios enhanced user interface (NetBIOS Enhanced User Interface, NetBEUI for short) protocol; correspondingly, the establishing module 73 may specifically obtain IP addresses that the wireless terminal assigns, by using the DHCP, for the wireless terminal and the host device and establish a communication link that is based on the network layer data transfer protocol between the host device and the wireless terminal.

In this embodiment, an obtaining module obtains a port type of a port corresponding to a wireless terminal reported by the wireless terminal, where the port type is based on a network layer data transfer protocol, so that a driving module is capable of driving the port by using a port driver corresponding to the port type; an establishing module establishes a communication link that is based on the network layer data transfer protocol between the wireless terminal and the host device through interaction with the host device via the port, so that a transmitting module is capable of transmitting a service packet and a type of the service packet via the communication link that is based on the network layer data transfer protocol and established by the establishing module; the host device and the wireless terminal are capable of parsing the service packet according to the type of the service packet. In this way, the host device does not need to upload a driver corresponding to a port corresponding to each service. Because each service corresponds to the same port that is based on the network layer data transfer protocol, the host device only needs to drive the port by using the port driver corresponding to the port, thereby reducing the driver development cost and ensuring the normal operation of wireless terminal services. In addition, the embodiment of the present invention does not need to rely on a wireless network and has high flexibility.

Persons of ordinary skill in the art should understand that, all or part of the steps of the foregoing method embodiments may be implemented by a program instructing relevant hardware. The foregoing program may be stored in a computer readable storage medium. When the program runs, the foregoing steps included in the method embodiments are performed. The foregoing storage medium may be any medium capable of storing program codes, such as a ROM, a RAM, a magnetic disk, or an optical disk.

The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A communication method for a wireless terminal, comprising:
    sending, by a wireless terminal, a report including a port type of a port corresponding to the wireless terminal to a host device based on a network layer data transfer protocol and assigning, by the wireless terminal, an IP address for the wireless terminal and an IP address for the host device;
    establishing, by the wireless terminal, a communication link that is based on the network layer data transfer protocol between the wireless terminal and the host device through interaction with the host device via the port according to the assigned IP address of the wireless terminal and the IP address for the host device; and
    transmitting, by the wireless terminal, an IP packet containing a service packet and a type of the service packet via the communication link that is based on the network layer data transfer protocol so as to allow parsing of the service packet according to the type of the service packet, and
    wherein the network layer data transfer protocol comprises an IP protocol, an SPX protocol/IPX protocol, or a NetBEUI protocol, and
    the IP address for the wireless terminal and the IP address for the host device are assigned using a Dynamic Host Configuration Protocol (DHCP) function of the wireless terminal.

2. The method according to claim 1, wherein
    the service packet and the type of the service packet are transmitted through data portion of the IP packet via the communication link based on the IP protocol.

3. The method according to claim 1, wherein the wireless terminal is configured to have capability of a data card or machine-to-machine (M2M) wireless terminal.

4. The method according to claim 1, wherein the type of the service packet comprises SCSI data, an AT command, IP data, or DIAG data.

5. The method according to claim 1, wherein the port for the communication link is driven using the port driver determined to correspond with the port type identified in the report.

6. The method according to claim 1, wherein the assigning includes: selecting, by the wireless terminal, the IP address for the wireless terminal and the IP address for the host terminal from a preconfigured address pool.

7. A communication method for a host device, comprising:
    obtaining, by a host device, a report including a port type of a port corresponding to a wireless terminal from the wireless terminal based on a network layer data transfer protocol;
    driving, by the host device, the port by using a port driver corresponding to the port type according to the report obtained;
    obtaining, by the host device, an IP address for the host device and an IP address for the wireless terminal which are assigned by the wireless terminal;
    establishing, by the host device, a communication link that is based on the network layer data transfer protocol between the host device and the wireless terminal through interaction with the wireless terminal via the port according to the assigned IP address for the host device and the IP address of the wireless terminal; and
    transmitting, by the host device, an IP packet containing a service packet and a type of the service packet via the communication link that is based on the network layer data transfer protocol so as to allow parsing of the service packet according to the type of the service packet, and wherein the network layer data transfer protocol comprises an IP protocol, an SPX protocol/IPX protocol, or a NetBEUI protocol, and the IP address for the host device and the IP address for the wireless terminal obtained by the host device are assigned by the wireless terminal using a Dynamic Host Configuration Protocol DHCP function of the wireless terminal.

8. The method according to claim 7, wherein
the service packet and the type of the service packet are transmitted through data portion of the IP packet via the communication link based on the IP protocol.

9. The method according to claim 7, wherein the wireless terminal is configured to have capability of a data card or machine-to-machine (M2M) wireless terminal.

10. The method according to claim 7, wherein the type of the service packet comprises SCSI data, an AT command, IP data, or DIAG data.

11. A wireless terminal, comprising:
a memory to store instructions;
at least one processor coupled to the memory configured to execute the instructions stored in the memory to:
  a port type of a port corresponding to the wireless terminal to a host device based on a network layer data transfer protocol and assigning, by the wireless terminal, an IP address for the wireless terminal and an IP address for the host device;
  establish a communication link that is based on the network layer data transfer protocol between the wireless terminal and the host device through interaction with the host device via the port according to the assigned IP address of the wireless terminal and the IP address for the host device; and
  transmit an IP packet containing a service packet and a type of the service packet via the communication link that is based on the network layer data transfer protocol so as to allow parsing of the service packet according to the type of the service packet, and wherein the network layer data transfer protocol comprises an IP protocol, an SPX protocol/IPX protocol, or NetBEUI protocol, and the IP address for the wireless terminal and the IP address for the host device are assigned by the wireless terminal using a Dynamic Host Configuration Protocol DHCP function of the wireless terminal.

12. A host device, comprising:
a memory to store instructions;
at least one processor coupled to the memory configured to execute the instructions stored in the memory to:
  obtain a report including a port type of a port corresponding to a wireless terminal from the wireless terminal, wherein the port type is based on a network layer data transfer protocol;
  drive the port by using a port driver corresponding to the port type according to the report obtained;
  obtain an IP address for the host device and an IP address for the wireless terminal which are assigned by the wireless terminal;
establish a communication link that is based on the network layer data transfer protocol between the host device and the wireless terminal through interaction with the wireless terminal via the port according to the assigned IP address of the wireless terminal and the IP address for the host device; and
  transmit an IP packet containing a service packet and a type of the service packet via the communication link that is based on the network layer data transfer protocol so as to allow parsing of the service packet according to the type of the service packet, and wherein the network layer data transfer protocol comprises an IP protocol, an SPX protocol/IPX protocol, or a NetBEUI protocol, and the IP address for the wireless terminal and the IP address for the host device are assigned by the wireless terminal using a Dynamic Host Configuration Protocol DHCP function of the wireless terminal.

* * * * *